(12) United States Patent
Cheung et al.

(10) Patent No.: US 11,466,622 B2
(45) Date of Patent: Oct. 11, 2022

(54) COMPOSITE AEROSPACE COMPONENT

(71) Applicant: PRATT & WHITNEY CANADA CORP., Longueuil (CA)

(72) Inventors: Kin-Leung Cheung, Toronto (CA); Bryan William Olver, Collingwood (CA); Stephen Caulfeild, Rockwood (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 404 days.

(21) Appl. No.: 16/179,308

(22) Filed: Nov. 2, 2018

(65) Prior Publication Data

US 2020/0095938 A1    Mar. 26, 2020

Related U.S. Application Data

(60) Provisional application No. 62/736,548, filed on Sep. 26, 2018.

(51) Int. Cl.

| | |
|---|---|
| *F02C 7/24* | (2006.01) |
| *B32B 27/00* | (2006.01) |
| *B32B 15/08* | (2006.01) |
| *B32B 3/26* | (2006.01) |
| *B32B 15/20* | (2006.01) |

(52) U.S. Cl.
CPC .............. *F02C 7/24* (2013.01); *B32B 27/00* (2013.01); *B32B 3/266* (2013.01); *B32B 15/08* (2013.01); *B32B 15/20* (2013.01); *B32B 2262/101* (2013.01); *B32B 2262/106* (2013.01)

(58) Field of Classification Search
CPC . F02C 7/24; B32B 27/00; B32B 3/266; B32B 15/08; B32B 15/20; B32B 2262/106; B32B 2262/101
USPC ........................................................ 181/290
See application file for complete search history.

(56) References Cited

U.S. PATENT DOCUMENTS

| | | | | |
|---|---|---|---|---|
| 4,926,963 | A * | 5/1990 | Snyder | B32B 15/04 |
| | | | | 181/213 |
| 9,909,501 | B2 * | 3/2018 | Caulfeild | F02K 1/827 |
| 9,919,500 | B2 * | 3/2018 | Vrljes | B32B 33/00 |
| 2018/0142698 | A1 * | 5/2018 | Cheung | F04D 29/325 |

FOREIGN PATENT DOCUMENTS

EP          3070313 A1      9/2016

* cited by examiner

*Primary Examiner* — Forrest M Phillips
(74) *Attorney, Agent, or Firm* — Norton Rose Fulbright Canada LLP

(57) ABSTRACT

An aerospace component, for example, used in a gas turbine engine, includes the following structurally-integrated layers: a metallic layer and a composite layer having reinforcing fibers embedded in a matrix material. The aerospace component can also include an insulating layer disposed between the metallic layer and the composite layer where the insulating layer has a thermal conductivity that is lower than a thermal conductivity of the composite layer.

16 Claims, 3 Drawing Sheets

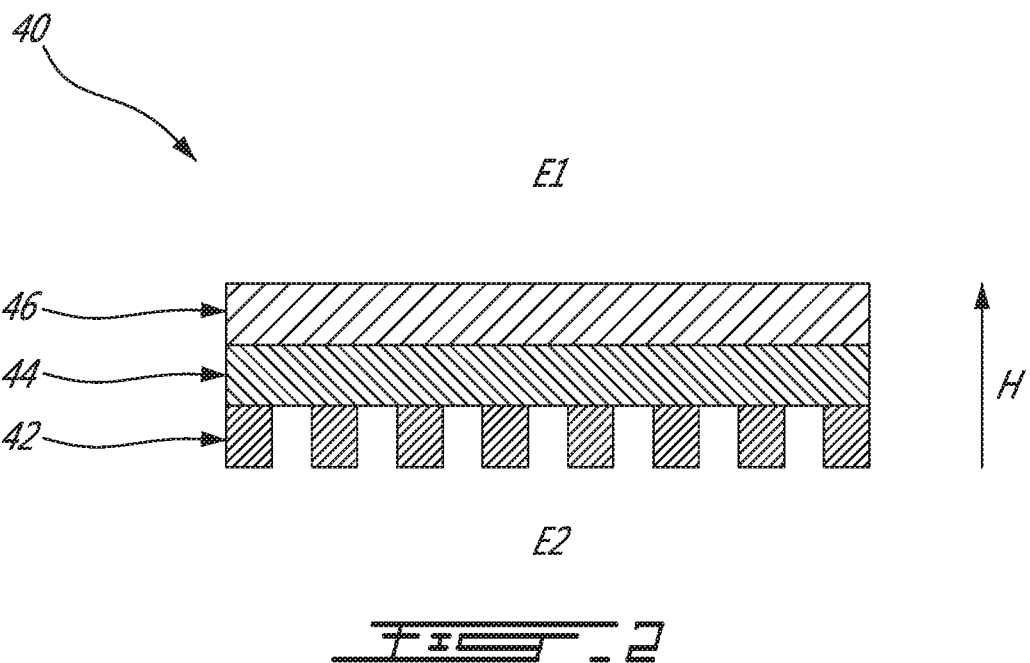
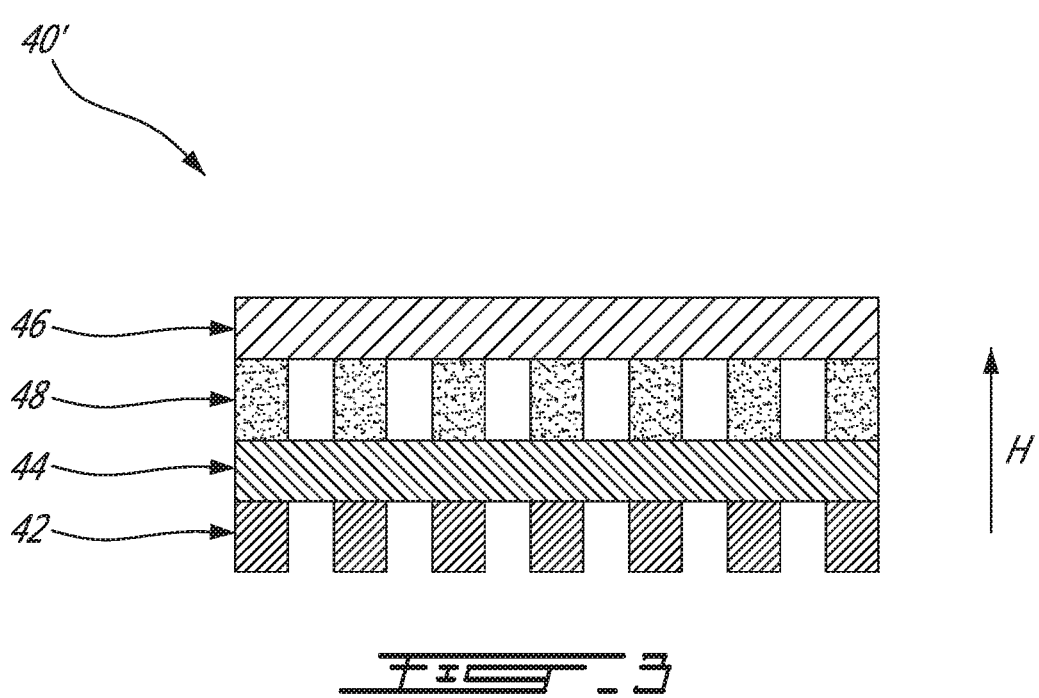

COMPOSITE AEROSPACE COMPONENT

CROSS-REFERENCE TO RELATED APPLICATIONS

This application claims priority from U.S. Provisional Patent Application No. 62/736,548 filed on Sep. 26, 2018.

FIELD

This relates generally to aerospace components, in particular, composite structures for use in gas turbine engines.

BACKGROUND

The strength of a composite aerospace component can become significantly reduced when exposed to elevated temperatures in case of a nearby fire event for example. Such loss in strength of a composite component that is under a mechanical load can increase the risk of failure of the composite component. Improvement is desirable.

SUMMARY

According to an aspect, there is provided an aerospace component comprising the following structurally-integrated layers: a metallic layer; and a composite layer having reinforcing fibers embedded in a matrix material.

In some embodiments, the metallic layer comprises a perforated sheet.

In some embodiments, the metallic layer comprises a mesh.

In some embodiments, the metallic layer comprises any one of the following: copper, a nickel-based alloy, a titanium-based alloy, and a ferrous alloy.

In some embodiments, the reinforcing fibers comprise carbon reinforcing fibers and the matrix material comprises a polymer.

In some embodiments, the aerospace component further includes an insulating layer disposed between the metallic layer and the composite layer, the insulating layer having a thermal conductivity that is lower than a thermal conductivity of the composite layer.

In some embodiments, the insulating layer comprises at least one of the following: a fiber-reinforced composite material comprising glass fibers and a polymer fiber in a polymer matrix material.

In some embodiments, the metallic layer is a first metallic layer and the aerospace component comprises a second metallic layer disposed between the insulating layer and the composite layer.

In some embodiments, the first metallic layer comprises copper.

In some embodiments, the first and second metallic layers each have openings extending therethrough.

In some embodiments, the second metallic layer comprises any one of the following: copper, a nickel-based alloy, a titanium-based alloy, and a ferrous alloy.

According to another aspect, there is provided an acoustic liner comprising: a perforated facing sheet; and a backing sheet spaced apart from the facing sheet, the backing sheet comprising the following structurally-integrated layers: a metallic layer; and a composite layer having reinforcing fibers embedded in a matrix material.

In some embodiments, the reinforcing fibers comprise carbon reinforcing fibers and the matrix material comprises a polymer; and the insulating layer comprises at least one of the following: a fiber-reinforced composite material comprising glass fibers and a polymer fiber in a polymer matrix material.

In some embodiments, the metallic layer is a first metallic layer and the backing sheet comprises a second metallic layer disposed between the insulating layer and the composite layer; the first metallic layer comprises copper; and the first and second metallic layers each have openings extending therethrough.

According to another aspect, there is provided a gas turbine engine comprising: an engine core; and a bypass duct disposed around the engine core, the bypass duct including an acoustic liner, the acoustic liner including a perforated facing sheet for interfacing with a flow of air in the bypass duct and a backing sheet spaced apart from the facing sheet, the backing sheet comprising the following structurally-integrated layers: a metallic layer; and a composite layer having reinforcing fibers embedded in a matrix material.

In some embodiments, the metallic layer is disposed between the facing sheet and the composite layer.

In some embodiments, the backing sheet comprises the following structurally-integrated layer: an insulating layer disposed between the metallic layer and the composite layer, the insulating layer having a thermal conductivity that is lower than a thermal conductivity of the composite layer.

In some embodiments, the reinforcing fibers comprise carbon reinforcing fibers and the matrix material comprises a polymer; and the insulating layer comprises at least one of the following: a fiber-reinforced composite material comprising glass fibers and a polymer fiber in a polymer matrix material.

In some embodiments, the metallic layer is a first metallic layer and the backing sheet comprises a second metallic layer disposed between the insulating layer and the composite layer; the first metallic layer comprises copper; and the first and second metallic layers each have openings extending therethrough.

Other features will become apparent from the drawings in conjunction with the following description.

BRIEF DESCRIPTION OF DRAWINGS

In the figures which illustrate example embodiments,

FIG. 2 is a schematic cross-sectional view of a composite structure, in accordance with an embodiment;

FIG. 3 is a schematic cross-sectional view of a composite structure, in accordance with another embodiment.

DETAILED DESCRIPTION

Figure 1:
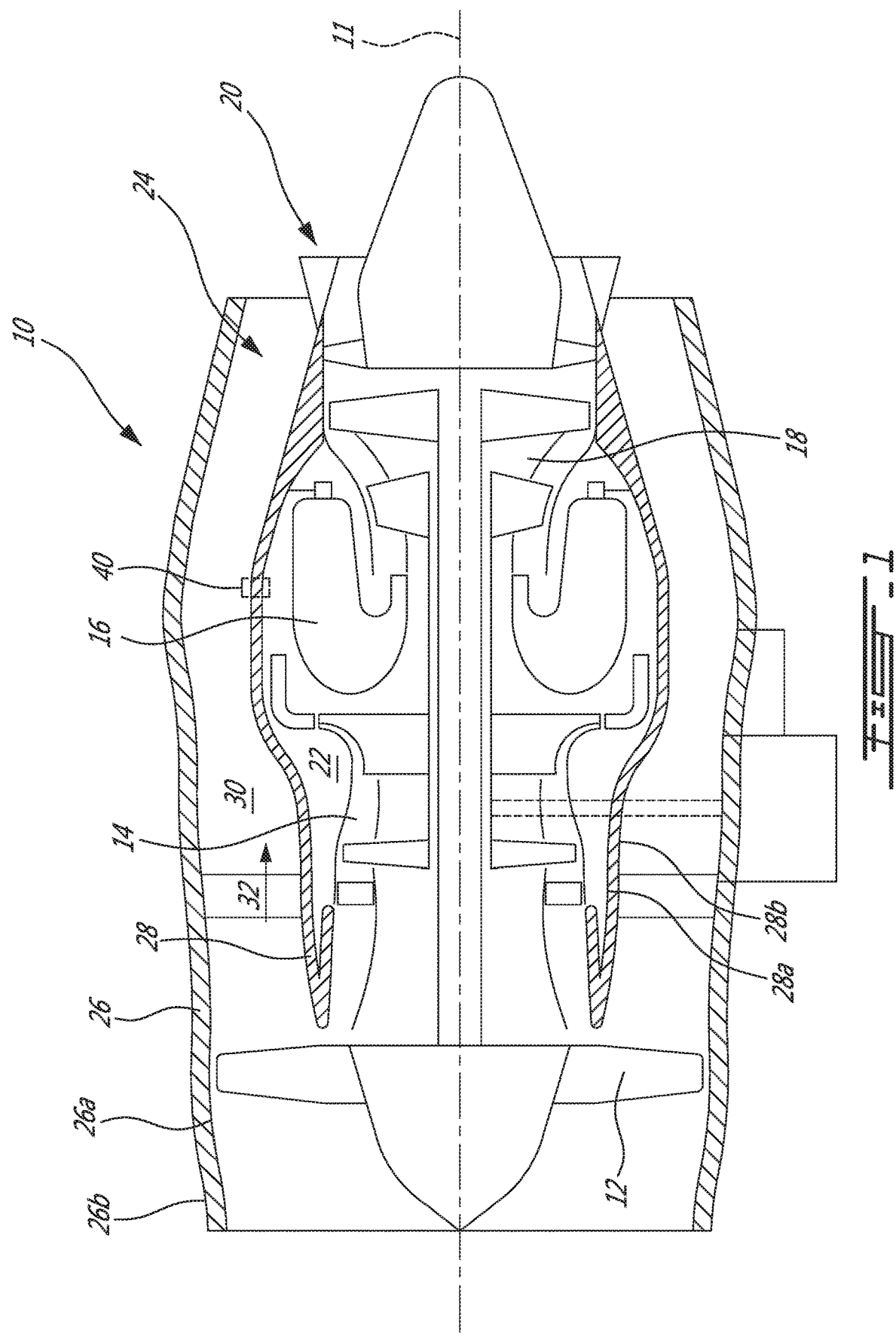
FIG. 1 is a partial schematic cross-sectional view of a gas turbine engine, in accordance with an embodiment.

FIG. 1 illustrates a gas turbine engine 10 of a type provided for use in subsonic flight, generally comprising in serial flow communication along a centerline 11: a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The compressor section 14 and the turbine section 18 form part of an engine core 20. The engine core 20 defines a main fluid path 22 in which the combustor 16 is provided. The engine core 20 is coaxially positioned within an annular bypass duct 24 including an annular radially outer bypass duct wall 26 and an annular radially inner bypass duct wall 28. The radially outer and inner bypass duct walls 26 and 28 define therebetween an annular bypass air passage 30 for directing a bypass air flow 32 drawn by the fan 12. The outer bypass duct wall 26 and the inner bypass duct wall 28 can perform structural functions in supporting parts of the engine core 20 and can be subjected to pressure loads due to the flow of air through the bypass duct 24 during operation of the engine 10. The outer bypass duct wall 26 includes an inner surface 26a facing the inner bypass duct wall 28 and an outer surface 26b. The inner bypass duct wall 28 includes an inner surface 28a and an outer surface 28b facing the outer bypass duct wall 26. In event of a fire in the combustor, the inner bypass duct may act as a firewall, subject to differential pressure across the walls of the duct. Similarly, outer bypass duct wall 26 includes an inner surface and an outer surface facing a nacelle cavity (not shown), the nacelle providing a housing for gas turbine engine 10. In the event of a fire in the nacelle, outer bypass duct wall 26 may act as a firewall, subject to differential pressure across the walls of the duct.

FIG. 2 shows a schematic cross-section of a composite structure 40 for use as an aerospace component, for example, in a gas turbine engine such as gas turbine engine 10. In some embodiments, composite structure 40 may be used on some or all of inner bypass duct wall 28 (as shown in FIG. 1), outer bypass duct wall 26, thrust reversers, intermediate case, tailcone, jet pipes, fan cases, and nacelle inlet, to name a few.

In some embodiments, composite structure 40 includes a first metallic layer 42, an insulating layer 44, and a composite layer 46.

As shown in FIG. 2, in some embodiments, insulating layer 44 is disposed between first metallic layer 42 and composite layer 46. In other embodiments, first metallic layer 42, insulating layer 44, and composite layer 46 may be layered in other distributions, for example, first metallic layer 42 disposed between insulating layer 44 and composite layer 46, or composite layer 46 disposed between first metallic layer 42 and insulating layer 44.

First metallic layer 42, insulating layer 44, and composite layer 46 may be may be bonded to each other by a suitable bonding adhesive, or otherwise suitably structurally integrated together. For example, first metallic layer 42 can be structurally embedded in (e.g., anchored to) a matrix material of insulating layer 44 for example. First metallic layer 42 may be formed from a network of metal wire, for example, a mesh, or a perforated sheet. As such, first metallic layer 42 may have openings extending therethrough.

First metallic layer 42 may have an areal density of less than 500 grams per square meter, for example, about 100 grams per square meter.

In some embodiments, first metallic layer 42 may be formed from copper or other conductive metals such as a nickel-based alloy, a titanium-based alloy, or a ferrous alloy.

Insulating layer 44 may be formed from a fiber-reinforced composite material such as reinforcing fibers embedded in a matrix material. The reinforcing fibers may be carbon, glass, polymer, or other suitable reinforcing fiber. The matrix material may be a polymeric material such as a thermoplastic polymer or a thermoset polymer, or other suitable matrix material. In some embodiments, insulating layer 44 may be a supported adhesive film.

Composite layer 46 may be formed from fibers such as reinforcing fibers embedded in a matrix material. The second reinforcing fibers may be carbon or glass, or other suitable reinforcing fiber. The matrix material may be a thermoplastic polymer or a thermoset polymer or other suitable matrix material. Composite layer 46 may be made of the same or different materials as insulating layer 44.

Composite structure 46 may reinforce composite structure 40 and provide structural support to composite structure 40, including first metallic layer 42, and insulating layer 44.

In some embodiments, a thermal conductivity of insulating layer 44 is lower than a thermal conductivity of composite layer 46, and the materials of insulating layer 44 and composite layer 46 are selected according to such parameters. In an example, the thermal conductivity of glass fibres used in an insulating layer 44 may be 60 percent of the thermal conductivity of carbon fibres used in a composite layer 46.

A thermal conductivity of first metallic layer 42 may be greater than the thermal conductivity of insulating layer 44 and composite layer 46. In an example, the thermal conductivity of copper used in a first metallic layer 42 may be 235 times the thermal conductivity of carbon fibres used in a composite layer 46 and the thermal conductivity of copper used in a first metallic layer 42 may be 380 times the thermal conductivity of glass fibres used in an insulating layer 44.

In some embodiments, it may be advantageous to orient composite structure 40 such that first metallic layer 42 is facing a site at risk of a fire event.

For example, in some embodiments, with composite structure 40 used on inner bypass duct wall 28, first metallic layer 42 of composite structure 40 may be adjacent engine core 20, such that first metallic layer 42 is radially inward insulating layer 44 and composite layer 46.

While FIG. 1 shows composite structure 40 used on inner bypass duct wall 28, it is contemplated that other components such as outer bypass duct wall 26 of gas turbine engine 10 may have composite structure 40.

In some embodiments, composite structure 40 may provide structural support to bypass duct 24 or other components of gas turbine engine 10.

FIG. 3 is a schematic cross-sectional view of a composite structure 40', in accordance with another embodiment. Composite structure 40' may be generally identical in structure to composite structure 40, with the addition of a second metallic layer 48, as discussed below.

In some embodiments, composite structure 40' includes a first metallic layer 42, an insulating layer 44, a second metallic layer 48, and a composite layer 46.

First metallic layer 42, insulating layer 44, second metallic layer 48, and composite layer 46 may be structurally integrated and layered as illustrated in FIG. 3. In other embodiments, first metallic layer 42, insulating layer 44, second metallic layer 48, and composite layer 46 may be layered in other distributions.

First metallic layer 42, insulating layer 44, second metallic layer 48, and composite layer 46 may be may be bonded to each other by a suitable bonding adhesive, or otherwise suitably attached or structurally integrated.

Second metallic layer 48 may have an areal density of less than 500 grams per square meter, for example, about 100 grams per square meter.

A combination of first metallic layer 42 and second metallic layer 48 may have an areal density of less than 500 grams per square meter, for example, about 100 grams per square meter.

A thermal conductivity of second metallic layer 48 may be greater than a thermal conductivity of insulating layer 44 and composite layer 46. In an example, the thermal conductivity of a metal used in second metallic layer 48 may be more than ten times higher than carbon used in an insulating layer 44 or a composite layer 46.

Second metallic layer 48 may be formed from a network of metal wire, for example, a mesh, or a perforated sheet. As such, second metallic layer 48 may have openings extending therethrough. Second metallic layer 48 may be formed in the same or different manner from first metallic layer 42.

In some embodiments, second metallic layer 48 may be formed from copper or other conductive metals such as a nickel-based alloy, a titanium-based alloy, or a ferrous alloy. Second metallic layer 48 may be made of the same or different materials as first metallic layer 42.

Insulating layer 44 and second metallic layer 48 may be non-parasitic, and share and contribute to structural support with first metallic layer 42 and composite layer 46.

In a similar manner to as discussed above, in some embodiments, it may be advantageous to orient composite structure 40' such that first metallic layer 42 is facing a site at risk of a fire event.

For example, in some embodiments, with composite structure 40' used on inner bypass duct wall 28, first metallic layer 42 of composite structure 40' may be adjacent engine core 20, such that first metallic layer 42 is radially inward insulating layer 44, second metallic layer 48 and composite layer 46.

It is contemplated that various components of gas turbine engine 10, as described herein, may have composite structure 40'.

In some embodiments, composite structure 40' may provide structural support to bypass duct 24 or other components of gas turbine engine 10.

Figure 4:
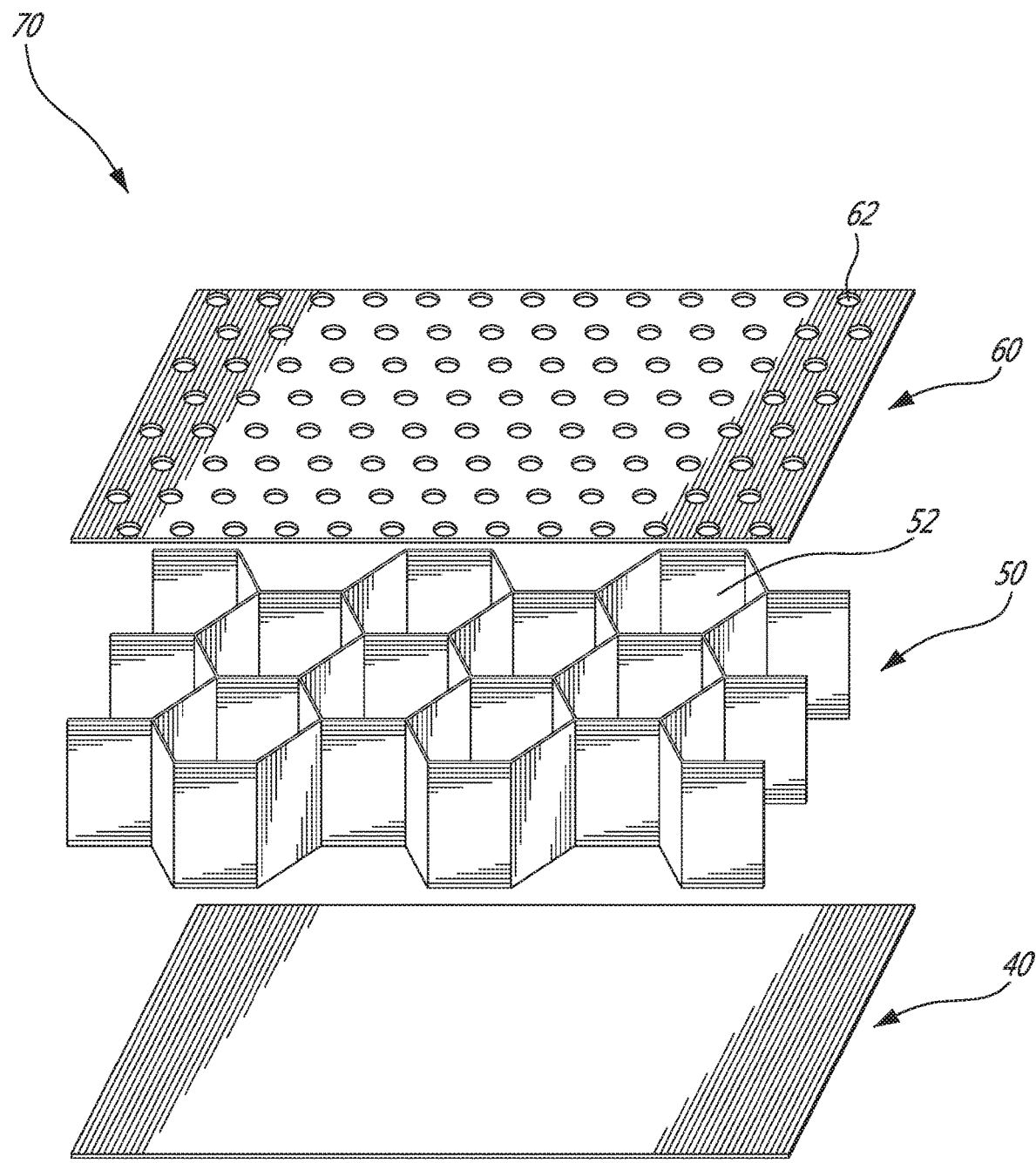
FIG. 4 is a schematic exploded perspective view of an acoustic liner, in accordance with an embodiment.

FIG. 4 is a schematic perspective view of an acoustic liner 70, in accordance with an embodiment, having a facing sheet 60, a backing sheet spaced apart from facing sheet 60 and formed of structurally-integrated layers of composite structure 40, and an acoustic layer 50 (e.g., honeycomb structure) disposed between composite structure 40 and facing sheet 60. In some embodiments, the backing sheet may be formed of composite structure 40'.

It is contemplated that various components of gas turbine engine 10, as described herein, may have acoustic liner 70. In an example, acoustic liner 70 may be used on some or all of inner bypass duct wall 28 and or of outer bypass duct wall 26.

As shown in FIG. 4, acoustic layer 50 may take the form of a honeycomb structure having dead air cavities 52. Acoustic layer 50 may be made of different materials having different acoustic properties. Cavities 52 may serve as Helmholtz resonating cavities for the purpose of noise attenuation.

As shown in FIG. 4, facing sheet 60 is formed with perforations 62 to allow sound pressure, for example, from a bypass duct such as annular bypass duct 24, to fill dead air cavities 52 in acoustic layer 50, which may act as a sound damping muffler by attenuating sound waves.

Facing sheet 60 may be made of a material able to withstand mechanical loads within gas turbine engine 10.

In some embodiments, facing sheet 60 may be made of carbon fiber epoxy, aluminum or glass fibers.

The backing sheet, in the form of composite structure 40 or 40' may protect acoustic liner 70 from fire, as described in further detail below.

In use, for example, on inner bypass duct wall 28, composite structure 40 or 40' is on one side exposed to a first fluidic environment E1, and on another side to a second fluidic environment E2 of gas turbine engine 10. First fluidic environment E1 may be air passage 30 of bypass duct 24, through which air flow 32 pressurizes, drawn by fan 12. Second fluidic environment E2 is an environment that could potentially be under fire, for example, adjacent combustor 16.

In a fire event facing first metallic layer 42 of composite structure 40, composite structure 40 acts as a fire wall subject to differential pressure.

In an example, a bypass duct formed of a conventional composite of many layers of carbon fiber polymer to maintain strength under pressure at an elevated temperature, in the case of a fire, and may be at risk of bursting under pressure due to substantially reduced strength at elevated temperature.

The use of composite structure 40 may result in a delay in temperature rise through the thickness of inner bypass duct wall 28, and as such, may allow the inner layers of insulating layer 44 and composite layer 46, in an example formed of carbon fiber, to maintain lower temperatures and higher strength for a longer time, and not to burst. In use on a gas turbine engine, this may allow for safe engine shut down and may reduce part weight.

First metallic layer 42 may provide a weight efficient means to conduct and dissipate heat (for example, from a fire) rapidly, and thereby may delay a transfer of heat through the thickness of composite structure 40, illustrated in FIG. 2 as arrow H, and delay temperature rise in insulating layer 44 and composite layer 46.

First metallic layer 42 may also reinforce a heat-affected area of composite structure 40, and structurally reinforce composite structure 40 and/or the surrounding area. As such, first metallic layer 42 may prevent rupture of composite structure 40 and/or the surrounding area due to pressure.

Insulating layer 44, having a thermal conductivity lower than composite layer 46, may further enhance a delay in transfer of heat H through composite structure 40 thickness and delay a temperature rise through the thickness of composite structure 40, and an increase in heat dissipation in a direction generally lateral to arrow H by first metallic layer 42 to cooler areas, which may then dissipate to surrounding cooler air by convection.

Second metallic layer 48 may further delay the transfer of heat H through composite structure 40 thickness to insulating layer 44 and composite layer 46 and increase in heat dissipation in a direction generally lateral to arrow H.

First metallic layer 42 and second metallic layer 48, alone or in combination, may further structurally support insulating layer 44 and composite layer 46 and may improve the bruckle resistance of insulating layer 44 and composite layer 46.

Composite structure 40 may be integrated in an annular wall that is subjected to a pressure differential and consequently subjected to hoop stress. The use of metallic layers 42 and/or 48 may facilitate the dissipation of heat circumferentially and axially so that the effects of a localized source of heat can be dissipated over a greater area of the annular wall and thereby delay the onset of a critical temperature rise and associated loss of structural strength of composite layer 36. In other words, the use of metallic layers 42 and/or 48 can increase an area and volume of composite structure 40 that is serving as a heat sink in the event of a local source of heat.

The ductility of first metallic layer 42 and second metallic layer 48, alone or in combination, may help prevent composite structure 40, and the structure it is part of, from bursting under pressure in a fire event for example.

In use with a bypass duct 24 having an acoustic liner 70, acoustic layer 52 may prevent or limit air flow through bypass duct 24 from reaching the backing sheet to cool it. Thus, in event of a fire, the backing sheet may get very hot and there may be an increased risk of bursting from the heat and pressure. As such, composite structure 40 may increase thermal conductivity of the backing sheet of acoustic liner 70, dissipating heat over a wider area, and additionally add some ductility to acoustic liner 70.

Of course, the above described embodiments are intended to be illustrative only and in no way limiting. The described embodiments are susceptible to many modifications of form, arrangement of parts, details and order of operation. The disclosure is intended to encompass all such modification within its scope, as defined by the claims.

What is claimed is:

1. An aerospace component comprising the following structurally-integrated layers:
    a metallic layer; and
    a composite layer having reinforcing fibers embedded in a matrix material, the composite layer being devoid of openings extending therethrough; and
    an insulating layer disposed between the metallic layer and the composite layer;
    wherein:
        the insulating layer has a thermal conductivity that is lower than a thermal conductivity of the composite layer;
        the metallic layer, the insulating layer and the composite layer define a wall resistant to a differential air pressure across the wall; and
        the aerospace component is a backing sheet of an acoustic liner.

2. The aerospace component of claim 1, wherein the metallic layer comprises a perforated sheet.

3. The aerospace component of claim 1, wherein the metallic layer comprises a mesh.

4. The aerospace component of claim 1, wherein the metallic layer comprises any one of the following: copper, a nickel-based alloy, a titanium-based alloy, and a ferrous alloy.

5. The aerospace component of claim 1, wherein the reinforcing fibers comprise carbon reinforcing fibers and the matrix material comprises a polymer.

6. The aerospace component of claim 1, wherein the insulating layer comprises at least one of the following: a fiber-reinforced composite material comprising glass fibers and a polymer fiber in a polymer matrix material.

7. The aerospace component of claim 1, wherein the metallic layer is a first metallic layer and the aerospace component comprises a second metallic layer disposed between the insulating layer and the composite layer.

8. The aerospace component of claim 7, wherein the first metallic layer comprises copper.

9. The aerospace component of claim 8, wherein the first and second metallic layers each have openings extending therethrough.

10. The aerospace component of claim 9, wherein the second metallic layer comprises any one of the following: copper, a nickel-based alloy, a titanium-based alloy, and a ferrous alloy.

11. An acoustic liner comprising: a perforated facing sheet; and a backing sheet spaced apart from the facing sheet, the backing sheet comprising the following structurally-integrated layers:
    a metallic layer; and
    a composite layer having reinforcing fibers embedded in a matrix material, the composite layer being devoid of openings extending therethrough; and
    an insulating layer disposed between the metallic layer and the composite layer;
    wherein:
        the insulating layer has a thermal conductivity that is lower than a thermal conductivity of the composite layer; and
        the metallic layer, the insulating layer and the composite layer define a wall resistant to a differential air pressure across the wall.

12. The acoustic liner of claim 11, wherein: the reinforcing fibers comprise carbon reinforcing fibers and the matrix material comprises a polymer; and the insulating layer comprises at least one of the following: a fiber-reinforced composite material comprising glass fibers and a polymer fiber in a polymer matrix material.

13. The acoustic liner of claim 12, wherein:
    the metallic layer is a first metallic layer and the backing sheet comprises a second metallic layer disposed between the insulating layer and the composite layer;
    the first metallic layer comprises copper; and
    the first and second metallic layers each have openings extending therethrough.

14. A gas turbine engine comprising:
    an engine core; and
    a bypass duct disposed around the engine core, the bypass duct including an acoustic liner, the acoustic liner including a perforated facing sheet for interfacing with a flow of air in the bypass duct and a backing sheet spaced apart from the facing sheet, the backing sheet comprising the following structurally-integrated layers:
    a metallic layer;
    a composite layer having reinforcing fibers embedded in a matrix material, the composite layer being devoid of openings extending therethrough; and
    an insulating layer disposed between the metallic layer and the composite layer;
    wherein:
        the insulating layer has a thermal conductivity that is lower than a thermal conductivity of the composite layer; and
        the metallic layer, the insulating layer and the composite layer define a wall resistant to a differential air pressure across the wall.

15. The gas turbine engine of claim 14, wherein the metallic layer is disposed between the facing sheet and the composite layer.

16. The gas turbine engine of claim 14, wherein:
    the reinforcing fibers comprise carbon reinforcing fibers and the matrix material comprises a polymer; and
    the insulating layer comprises at least one of the following: a fiber-reinforced composite material comprising glass fibers and a polymer fiber in a polymer matrix material.

* * * * *